March 17, 1970     L. DARR     3,501,191
TONG STICKS FOR USE AS CHOPSTICKS AND THE LIKE
Filed Dec. 28, 1967     2 Sheets-Sheet 2
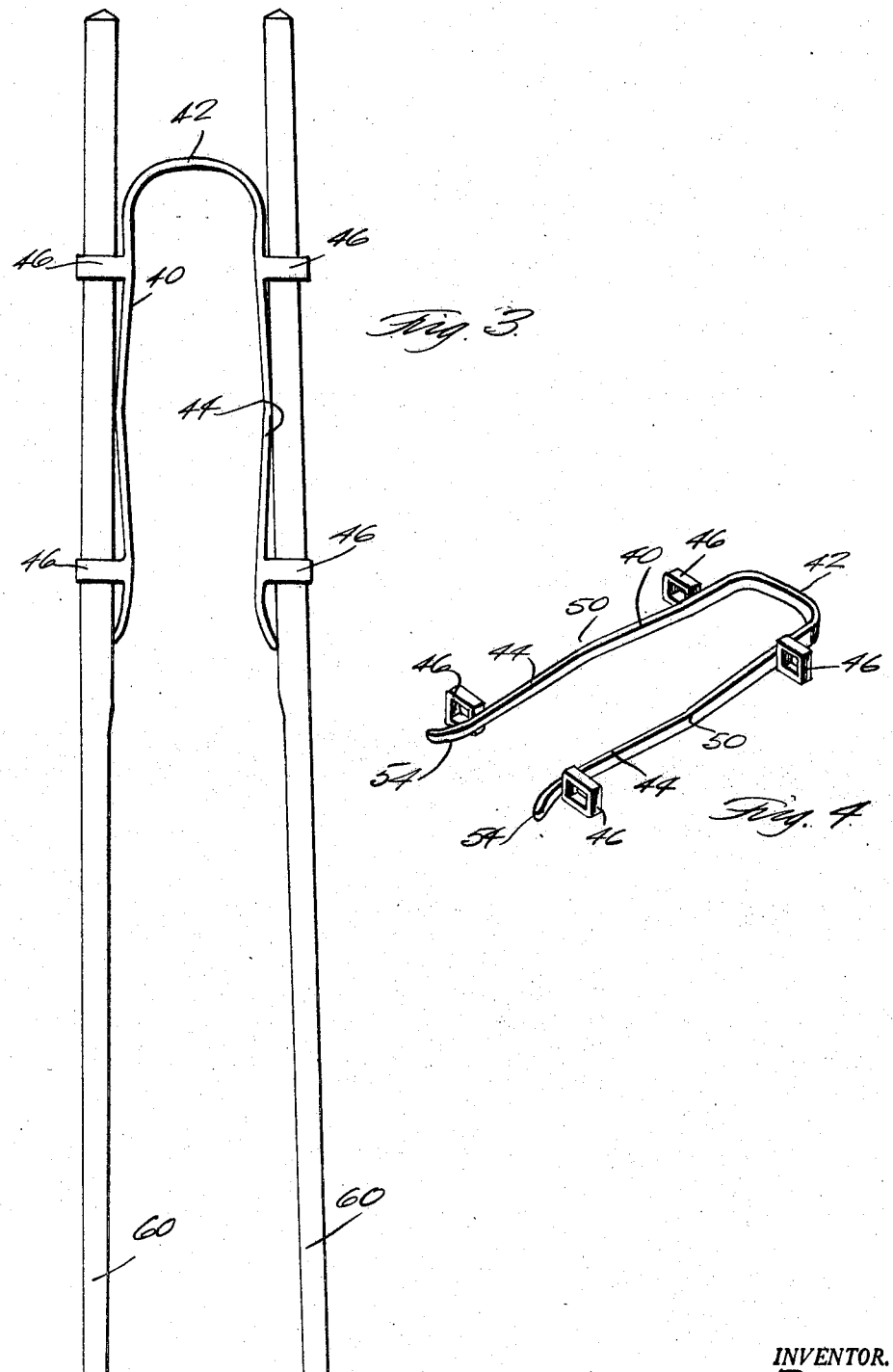
INVENTOR.
LESLIE DARR
BY
Victor J. Evans & Co.
ATTORNEYS United States Patent Office 3,501,191
Patented Mar. 17, 1970

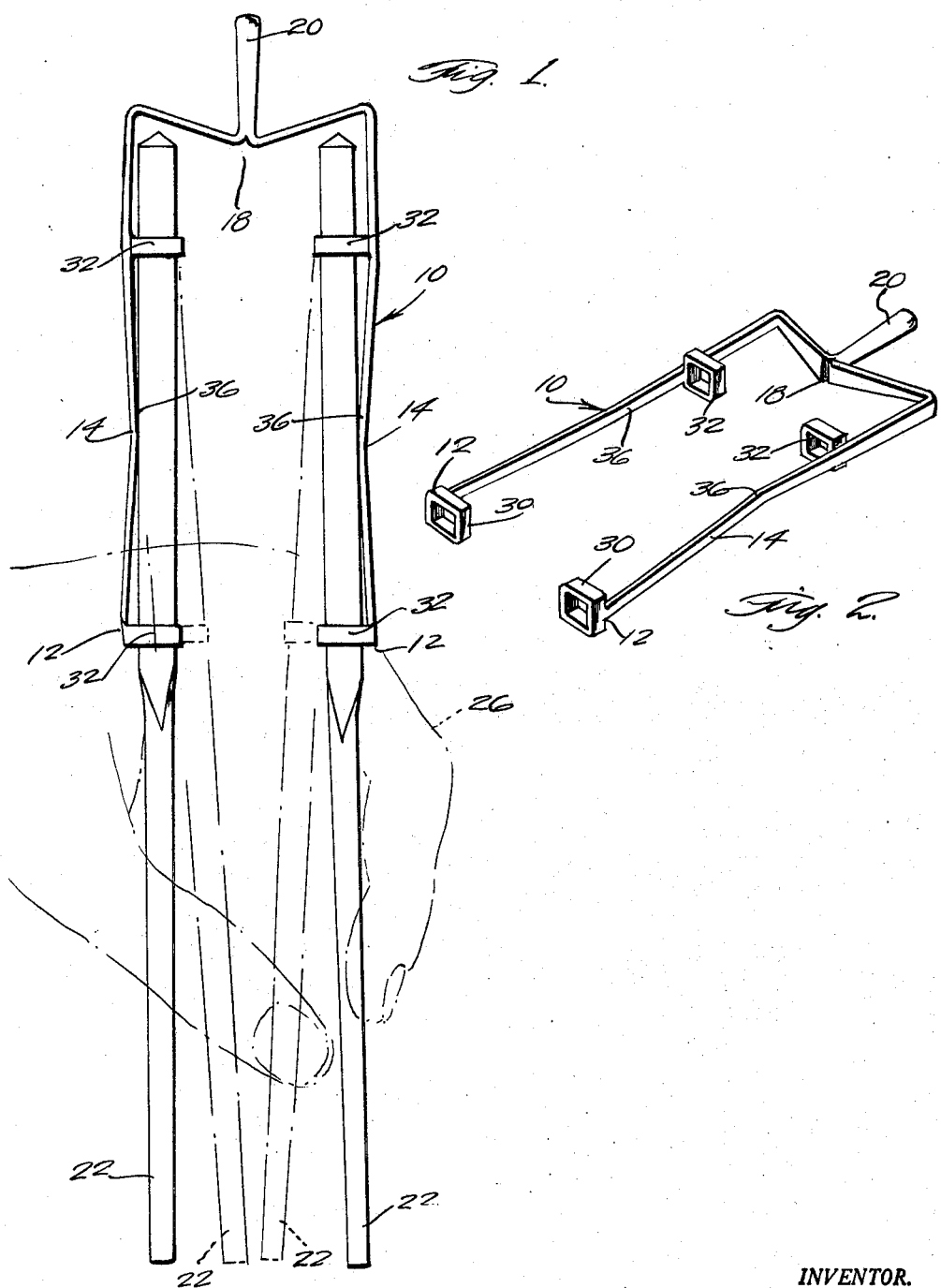

3,501,191
TONG STICKS FOR USE AS CHOPSTICKS
AND THE LIKE
Leslie Darr, Rte. 3, S. 9th, Walla Walla, Wash. 99362
Filed Dec. 28, 1967, Ser. No. 694,312
Int. Cl. B25b 9/00; B66c 1/00
U.S. Cl. 294—16                                    6 Claims

ABSTRACT OF THE DISCLOSURE

A spring device mechanism that is contoured for receiving in a fixed relation conventional or special type of chopsticks for holding the chopsticks in place while in use, and to facilitate one's eating with the tong sticks or chopsticks which is much easier than use of ordinary chopsticks without the advantage of the present invention.

---

The present invention relates to improved tong sticks for use as chopsticks, and more particularly the invention relates to providing a device forming an assembly for the insertion of chopsticks. The chopsticks are inserted into holder openings and are held securely in place by a slight amount of tension which is asserted by the spring assembly, and are provided for assisting one eating oriental foods as well as other bite-sized foods with great facility.

An object, therefore, of the present invention is to provide tong sticks or chopstick holders that are of general U-shaped construction with chopstick holder openings that can be made to hold and retain in position chopsticks effectively while in use. Another feature of the present invention is to provide holders for chopsticks that can be made and shaped to accommodate any shape of the upper part of the chopsticks, whether round, square, triangular or the like.

A further feature and advantage of the present invention is to provide a spring type holder device for chopsticks with tension means or contoured sections for providing tension for retaining and securing the chopsticks in close proximity in rigid relation to each other for use by the user.

The above and other objects and advantages of the invention will become apparent upon full consideration of the following detailed description and accompanying drawings in which:

FIGURE 1 is a plan view of tong sticks in accordance with a preferred embodiment of the present invention, this preferred embodiment being that of the elected species;

FIGURE 2 is a generally perspective view thereof;

FIGURE 3 is a plan view of a further preferred embodiment of the present invention; and FIGURE 4 is a generally perspective view of the preferred embodiment shown in FIGURE 3.

Referring now to the drawings, there is shown a generally U-shaped support member 10 having free ends 12, 12, and arms 14, 14. The connected ends of the arms 14, 14 are joined by a bridging section 18 that is generally T-shaped, and is provided in the T-shaped portion with a handle 20. The bridging section 18 is slightly deformed concavely about the handle so that added tension is provided with the necessary resilience of character to provide the necessary spring action as the U-shaped support member 10 moves the supported or carried chopsticks 22, 22, as shown in dotted line in FIGURE 1. FIGURE 1 also shows diagrammatically the manner in which the chopsticks are held by a hand 26 in manipulating the chopsticks 22, 22 in the support and carriage of food while one is eating.

At the free ends 12, 12 of the U-shaped support member, there are provided spaced chopstick holder opening means 30, 30, which with chopstick holder opening means 32, 32, form a pair. The interior opening of the opening means 32, 32 are square for being adapted to retain the upper contoured shape of the chopsticks, whether it be circular or square cross-section, and the opening means 30, 32 are disposed on the sides of the U-shaped member. The intermediate portions 36, 36 are distorted or contoured so that they provide tensioning or biasing effect upon the chopsticks as shown for retaining the chopsticks within the pair of spaced chopstick holder openings.

In FIGURES 3 and 4, there is shown a further preferred embodiment, wherein there is a substantially U-shaped support member 40 having a bridging section 42 for a pair of arms 44, 44, and on each arm there is mounted a pair of spacially separated chopstick holder openings 46, 46. The openings may have a square or rectangular cross-section, and the peripheral design or construction may also be of generally square or rectangular section.

At a point intermediate the pair of chopstick holder openings 46, 46, there is a contoured or biased, distorted portion 50, which is sufficient in magnitude to cause a biasing or tension-effect upon the chopstick when it is passing through a pair of holder openings 46, 46.

Also for engaging the chopstick passing through the pair of holder openings 46, 46 is an extension or ear portion 54, 54, which engages the chopstick also for retentive or gripping purposes in providing the biasing function described above.

In the openings 46, 46, there is provided a chopstick 60, 60 as shown in FIGURE 3. The bridging section 42 is constructed of metal as is the T-shaped bridging portion 18, and the metal is of sufficient characteristic that it provides all of the necessary tension or biasing or spring effect that is desired, an accordance with the practice of the present invention.

Additional embodiments of the invention in this specification will occur to others, and therefore it is intended that the scope of the invention be limited only by the appended claims and not by the embodiments described hereinabove.

Accordingly, reference should be made to the following claims in determining the full scope of the invention.

What is claimed is:

1. A chopstick holder of generally U-shaped configuration including a bridging member and a pair of generally parallel leg portions, a pair of holder elements on each leg portion extending in substantially perpendicular relation thereto and having a central generally rectangular opening therein, one element of each pair being adjacent the free end of its associated leg and the other element of each pair being adjacent the bridging member, each leg portion having a bowed portion extending in the direction of the elements midway between the elements of the associated pair of elements adapted to engage a chopstick to clamp the same in the holder elements.

2. The invention according to claim 1 wherein the bridging section between the arms is generally straight.

3. The invention according to claim 1 wherein the bridging section between the arms is generally T-shaped.

4. The structure of claim 1 wherein the elements and the bowed portions extend inwardly from the confronting sides of the leg portions.

5. The structure of claim 1 wherein the elements and the bowed portions extend outwardly from the remote sides of the leg portions.

6. The invention according to claim 5 wherein the leg portions terminate in outwardly biased portions adapted to extend the chopsticks.

References Cited

UNITED STATES PATENTS 3,186,749   6/1965   Dawes _____ 294—16

FOREIGN PATENTS 9,580   6/1909   England.

EVON C. BLUNK, Primary Examiner

R. S. GAITHER, Assistant Examiner

U.S. Cl. X.R.

294—99